United States Patent
Grover et al.

(10) Patent No.: US 6,354,803 B1
(45) Date of Patent: Mar. 12, 2002

(54) BLADE DAMPER AND METHOD FOR MAKING SAME

(75) Inventors: Garth Kneeland Grover, Bethel, ME (US); Gary Charles Liotta, Beverly, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/607,750

(22) Filed: Jun. 30, 2000

(51) Int. Cl.[7] ................................................. F01D 5/10
(52) U.S. Cl. ................... 416/190; 416/193 A; 416/500; 29/889.21; 29/889.71
(58) Field of Search .......................... 415/119; 416/190, 416/193 A, 500, 1; 277/491, 411, 531, 433; 188/378; 29/889.2, 889.21, 889.71

(56) References Cited

U.S. PATENT DOCUMENTS

| | | | |
|---|---|---|---|
| 4,936,749 A | 6/1990 | Arrao et al. ............. | 416/193 A |
| 5,215,442 A | * 6/1993 | Steckle et al. ............... | 416/248 |
| 5,302,085 A | 4/1994 | Dietz et al. ............. | 416/220 R |
| 5,369,882 A | 12/1994 | Dietz et al. ................. | 29/889.1 |
| 5,746,578 A | 5/1998 | Brassfield et al. ........... | 416/190 |
| 5,749,705 A | 5/1998 | Clarke et al. ............... | 416/190 |

* cited by examiner

Primary Examiner—Edward K. Look
Assistant Examiner—Richard Edgar
(74) Attorney, Agent, or Firm—Andrew C. Hess; Rodney M. Young

(57) ABSTRACT

A turbine engine blade damper for damping vibrations of blades in a turbine engine. The blade damper includes an elongate body extending between a forward end and a rearward end opposite the forward end. The body is sized and shaped for receipt within a gap formed between adjacent platforms of the blades so the body frictionally engages the adjacent platforms to dampen vibrations of the blades and to prevent air from passing through the corresponding gap during engine operation. The damper also includes a retainer mounted on at least one of the forward and rearward ends of the body. The retainer is sized and shaped for receipt within a recess formed in at least one of the adjacent blades to hold the body between the blades. The retainer is sized and shaped to prevent air from passing between the blades and the retainer during engine operation.

15 Claims, 3 Drawing Sheets

BLADE DAMPER AND METHOD FOR MAKING SAME

The United States government has rights in this invention under Contract Nos. DAAH10-98-C-0023 and F336155-98-C-2803 awarded by the Departments of the Army and Air Force, respectively.

BACKGROUND OF THE INVENTION

The present invention relates generally to blade dampers for damping vibratory responses of blades in turbine engines such as gas turbine aircraft engines.

Turbine engines have a stator and one or more rotors. Each rotor has rows of blades mounted on one or more disks rotatably mounted on the stator. The blades and disks have natural frequencies at which they resonate when excited. As the blades and disks resonate, stresses in the blades and disks rise and fall. Over time these oscillating stresses can cause the blades and/or the disks to fail due to material fatigue. The magnitudes of the oscillating stresses in the blades and disks can be reduced and the part lives can be increased by damping the vibratory response of these parts.

Various types of blade dampers have been developed to dampen vibratory responses. For example, some blades include shrouds extending between airfoils of adjacent blades to dampen vibratory response. Although connecting adjacent blades with shrouds can effectively dampen vibratory response, the shrouds increase blade weight and resulting stresses. Because stresses increase with rotational speed, shrouds may not be useable on blades which are intended to rotate at high speeds such as high pressure turbine blades of aircraft engines.

Another type of damper is an under-platform damper which is positioned between the disk and the blade. As the rotor rotates, these dampers are forced radially outward to simultaneously engage inboard facing surfaces of adjacent blades. The friction between the dampers and blades dampens the vibrations of the blades thereby reducing the vibratory stresses and increasing the blade life. Moreover as will be appreciated by those skilled in the art, the dampers are carried by the blades so the friction between blades and the disks increases and loading on portions of the blades and the disk increases. This increased friction and loading also affects the vibratory response of the blades. Some of these under-platform dampers have an additional advantage in that they seal gaps between adjacent blades to improve cooling air flows between the blades and disk.

SUMMARY OF THE INVENTION

Among the several features of the present invention may be noted the provision of a turbine engine blade damper for damping vibrations of blades in a turbine engine. The blade damper includes an elongate body extending between a forward end and a rearward end opposite the forward end. The body is sized and shaped for receipt within a gap formed between adjacent platforms of the blades so the body frictionally engages the adjacent platforms to dampen vibrations of the blades and to prevent air from passing through the corresponding gap during engine operation. The damper also includes a retainer mounted on at least one of the forward and rearward ends of the body. The retainer is sized and shaped for receipt within a recess formed in at least one of the adjacent blades to hold the body between the blades. The retainer is sized and shaped to prevent air from passing between the blades and the retainer during engine operation.

In another aspect, the present invention includes a method of manufacturing a turbine engine blade damper for damping vibrations of blades in a turbine engine. The method comprises the steps of cutting a wire to a length corresponding to a groove formed in a blade platform with which the damper is to be used, and attaching a retainer to an end of the wire.

In yet another aspect, the present invention includes a turbine engine comprising a disk having a generally circular periphery and a plurality of blades mounted about the periphery of the disk. Each of the blades includes an airfoil extending outward from a platform. The engine also includes a damper for damping vibrations of the plurality of blades. The damper including an elongate body and a retainer mounted on at least one end of the body. The retainer is sized and shaped for receipt within a recess formed in at least one of the adjacent blades to hold the damper between the blades. The retainer prevents air from passing between the blades and the retainer during engine operation.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
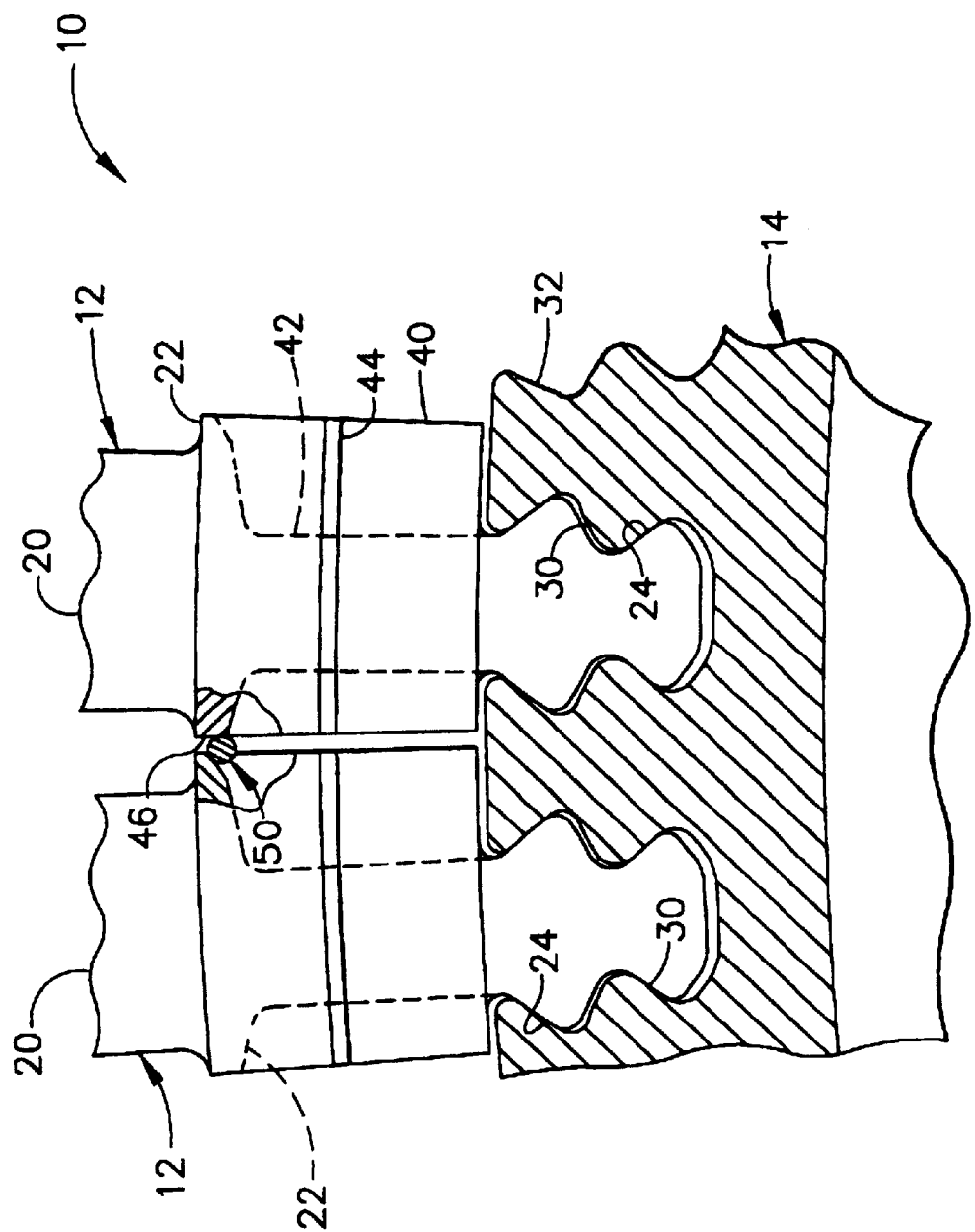
FIG. 1 is a fragmentary front elevation of a disk and blades shown in partial section to display a damper of the present invention.

Referring now to the drawings and in particular to FIG. 1, a portion of a turbine engine such as a gas turbine aircraft engine is designated is its entirety by the reference number 10. The engine 10 includes a plurality of blades (generally designated by 12) mounted on a disk (generally designated by 14). Each blade 12 has an airfoil 20 (partially shown) extending outward (upward as shown in FIG. 1) from a platform 22. A dovetail 24 extends inward from the platform 22. The dovetail 24 is sized and shaped for receipt in a complimentary slot 30 in the disk 14 defined by posts 32. As further illustrated in FIG. 2, a skirt 40 extends inward from each end of the platform 22. The skirts 40 and platform 22 define a cavity 42 over each post 32 (FIG. 1) for circulating cooling air over the post and around the dovetail 24. Wings 44 extend away from the skirts 40 for reducing clearances between the blade 12 and adjacent stator structures (not shown) as is well known in the art. A gap 46 (FIG. 1) separates the platforms 22 of adjacent blades 12.

Figure 2:
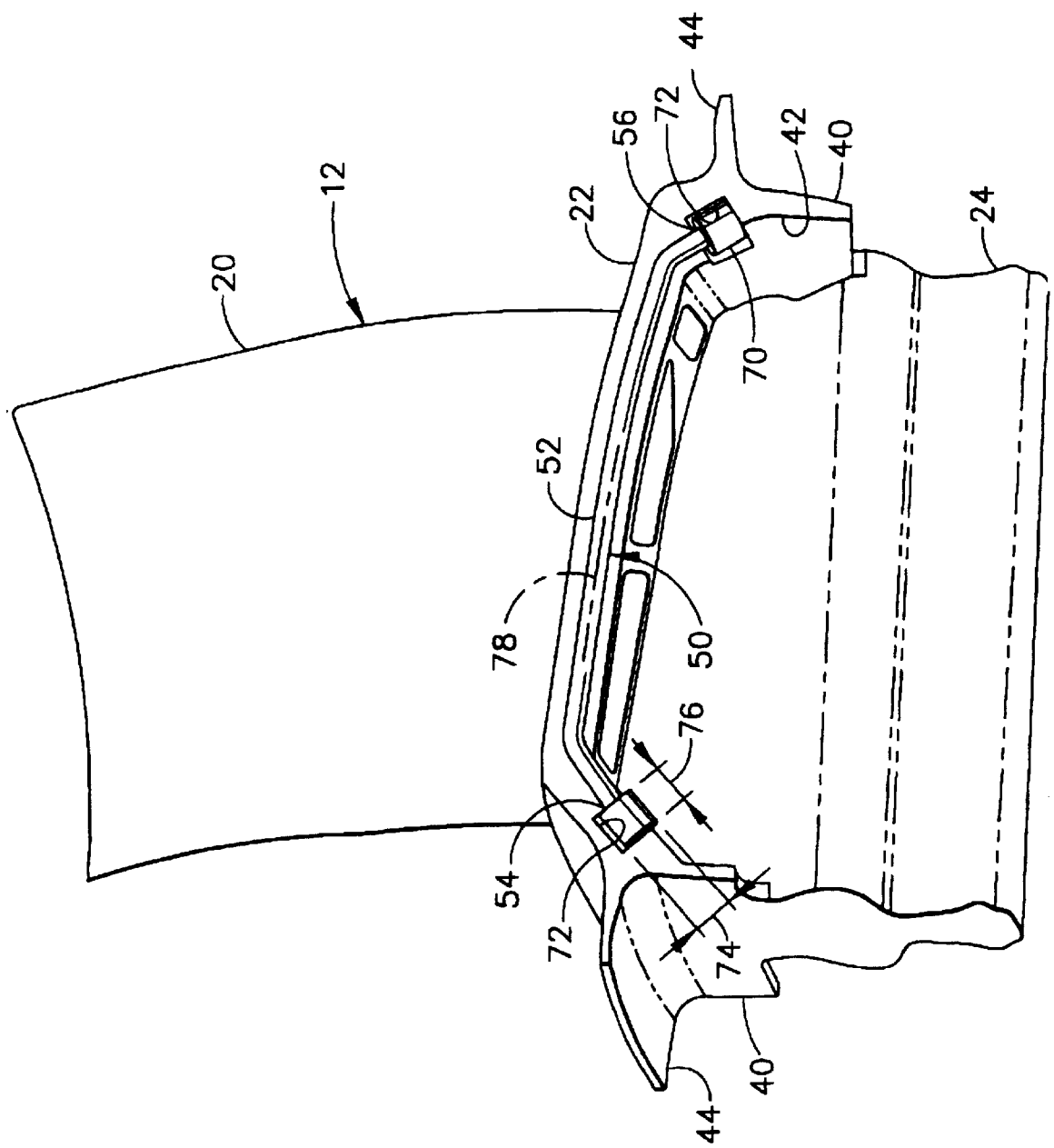
FIG. 2 is a perspective of one of the blades and a damper of the present invention.

As illustrated in FIG. 1, a damper, generally designated by 50, is positioned between the platforms 22 of adjacent blades 12 for damping vibrations of the blades. As further shown in FIG. 2, the damper 50 has an elongate body 52 extending between a forward end 54 and a rearward end 56 opposite the forward end. The body 52 is sized and shaped for receipt within the gap 46 formed between adjacent platforms 22 of the blades 12 so the body frictionally engages the adjacent platforms to dampen vibrations of the blades and to prevent air from passing through the gap during engine operation. Although the body 52 may have other configurations without departing from the scope of the present invention, in one preferred embodiment adapted for use within a gap 46 having a width 58 (FIG. 3) of about 0.005 to about 0.010 inches, the body is a cylindrical wire having a diameter 60 (FIG. 3) of about 0.045 inches. Thus, the wire has a diameter 60 greater than the width 58 of the gap 46 formed between adjacent platforms 22 of the blades 12. Further as illustrated in FIG. 2, the wire has a length generally equal to the platforms 22 of the blades 12.

A cylindrical retainer 70 is mounted on each end 54, 56 of the body 52. As illustrated in FIG. 2, each retainer 70 is sized and shaped for receipt within a complimentary recess 72 formed in each of the blades 12 to hold the body 52 between the blades both radially and axially so the damper 50 remains in position when the rotor is spinning and when it is at rest. Moreover, the retainer 70 is sized and shaped to prevent air from passing between the blades 12 and the retainer during engine operation. Although the retainer 70 may have other configurations without departing from the scope of the present invention, in one preferred embodiment the retainer is cylindrical having a diameter 74 of about 0.075 inches and a length 76 of about 0.075 inches. As illustrated in FIG. 2, the body 52 has a central axis 78 and the retainer 70 is offset from the central axis. Morever, the retainer 70 is angled with respect to the central axis 78 of the body 52 to conform to the shape of the platform 22.

Figure 3:
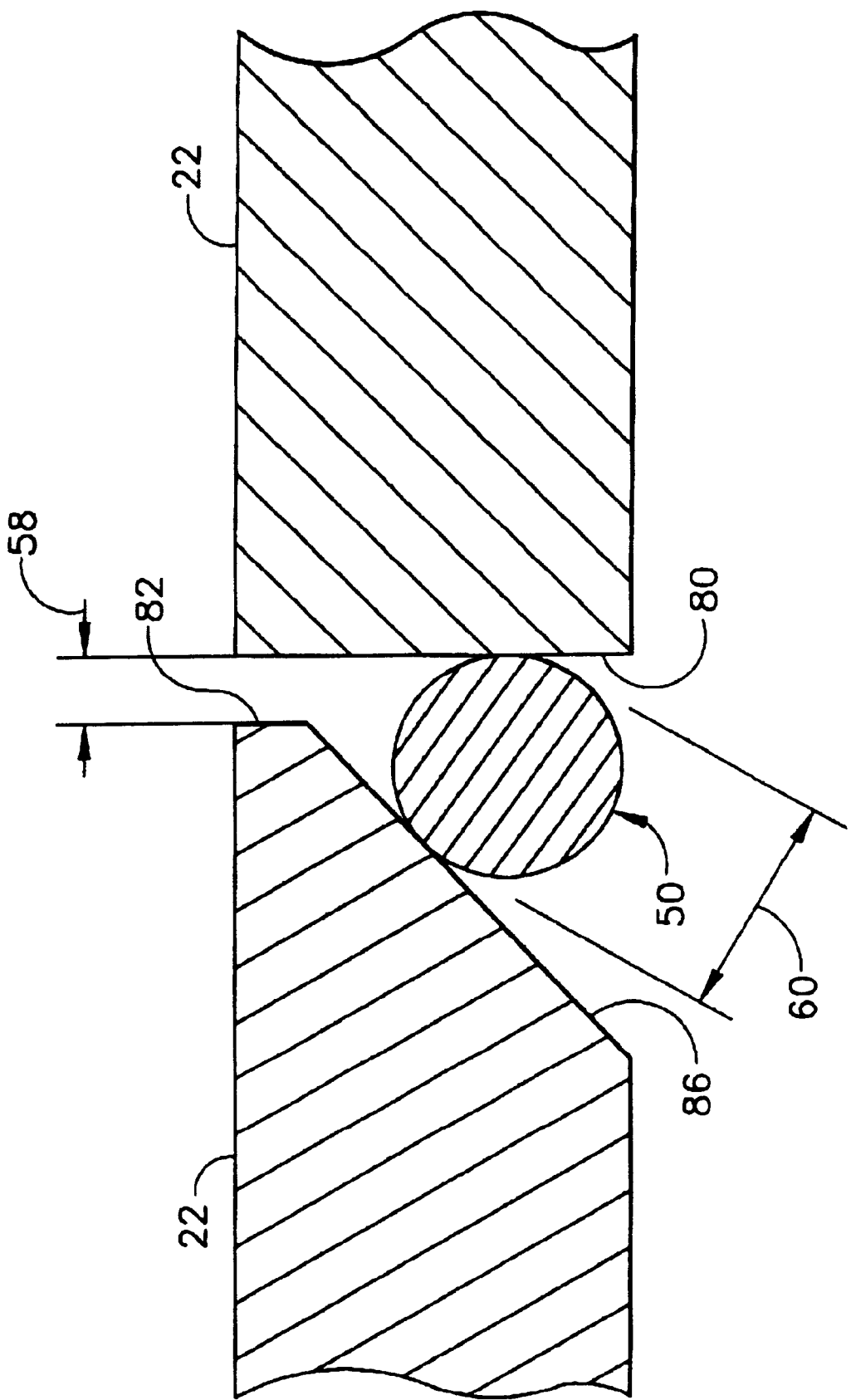
FIG. 3 is a detail of the blades and damper shown in FIG. 1.

As shown in FIG. 3, each platform 22 of the blades 12 has a suction side 80 and a pressure side 82 opposite the suction side. Although the suction side 80 and pressure side 82 may have different configurations without departing from the scope of the present invention, in one preferred embodiment the suction side extends radially and a portion of the pressure side extends at an angle with respect to the suction side. This configuration causes the damper to radially and tangentially engage adjacent blades to dampen relative motion both radially and tangentially. Further, the pressure side 82 has a groove 86 formed by the angled portion and the recesses 72. The groove 86 receives the body 52 when the damper 50 is installed between the blades 12.

To manufacture the damper 50 of the present invention, a wire is cut to a length corresponding to the groove 86 formed in the blade platform 22. A retainer 70 is attached to each end of the wire, and the body 52 is bent to conform to the shape of the groove 86. Although the retainers 70 may be attached using other methods without departing from the scope of the present invention, in one preferred embodiment the retainers are attached to the wire by swaging them in place. Because high loads are not exerted on the retainers 70 during engine operation, swaging provides an adequate connection between the retainer 70 and the body 52 of the damper 50. The body 52 and the retainers 70 may be made of any conventional material such as Hastelloy material. Hastelloy is a federally registered trademark of Haynes International, Inc. of Kokomo, Ind.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A turbine engine blade damper for damping vibrations of blades in a turbine engine, said blade damper comprising:
   an elongate body extending between a forward end and a rearward end opposite said forward end, the body being sized and shaped for receipt within a gap formed between adjacent platforms of the blades so that the body frictionally engages said adjacent platforms to dampen vibrations of said blades and to prevent air from passing through said gap during engine operation; and
   a retainer mounted on at least one of said forward end and said rearward end of the body, the retainer being sized and shaped for receipt within a recess formed in at least one of the adjacent blades to hold the body between the blades, said retainer being sized and shaped to prevent air from passing between the blades and the retainer during engine operation.

2. A damper as set forth in claim 1 wherein said retainer is a forward retainer mounted on said forward end of the body and the damper further comprises a rearward retainer mounted on said rearward end of the body, the rearward retainer being sized and shaped for receipt within a recess formed in at least one of the adjacent blades to hold the body between the blades, said rearward retainer being sized and shaped to prevent air from passing between the blades and said rearward retainer during engine operation.

3. A damper as set forth in claim 1 wherein the body is a wire.

4. A damper as set forth in claim 3 wherein the wire is cylindrical.

5. A damper as set forth in claim 4 wherein the wire has a diameter greater than a width of the gap formed between adjacent platforms of the blades.

6. A damper as set forth in claim 1 wherein the retainer is cylindrical.

7. A damper as set forth in claim 1 wherein the body has a central axis and the retainer is offset from said central axis.

8. A damper as set forth in claim 7 wherein the retainer is angled with respect to the central axis of the body.

9. A damper as set forth in claim 1 wherein the body has a length generally equal to the platforms of the blades.

10. A method of manufacturing a turbine engine blade damper for damping vibrations of blades in a turbine engine, said method comprising the steps of
   cutting a wire to a length corresponding to a groove formed in a blade platform with which the damper is to be used; and
   attaching a retainer to an end of the wire.

11. A method as set forth in claim 10 further comprising the step of forming the cut wire to a shape corresponding to the groove.

12. A method as set forth in claim 10 wherein the step of attaching the retainer is performed by swaging the retainer onto the wire.

13. A turbine engine comprising:
   a disk having a generally circular periphery;
   a plurality of blades mounted about the periphery of the disk, each of said blades including an airfoil extending outward from a platform; and
   a damper for damping vibrations of said plurality of blades, the damper including an elongate body extending between a forward end and a rearward end opposite said forward end, the body being sized and shaped for receipt within a gap formed between adjacent platforms of said plurality of blades so that the body frictionally engages said adjacent platforms to dampen vibrations of said blades and to prevent air from passing through said gap during engine operation, the damper having a retainer mounted on at least one of said forward end and said rearward end, the retainer being sized and shaped for receipt within a recess formed in at least one of the adjacent blades to hold the damper between the blades, said retainer preventing air from passing between the blades and the retainer during engine operation.

14. An engine as set forth in claim 13 wherein the platform of each of said plurality of blades has a suction side and a pressure side, and wherein one of said suction side and said pressure side extends radially.

15. An engine as set forth in claim 14 wherein said suction side extends radially.

* * * * *